Aug. 12 1924.
F. J. MacDONALD
1,504,255
METHOD OF MANUFACTURING BIAS FABRIC AND APPARATUS THEREFOR
Filed Dec. 24, 1918     5 Sheets-Sheet 5
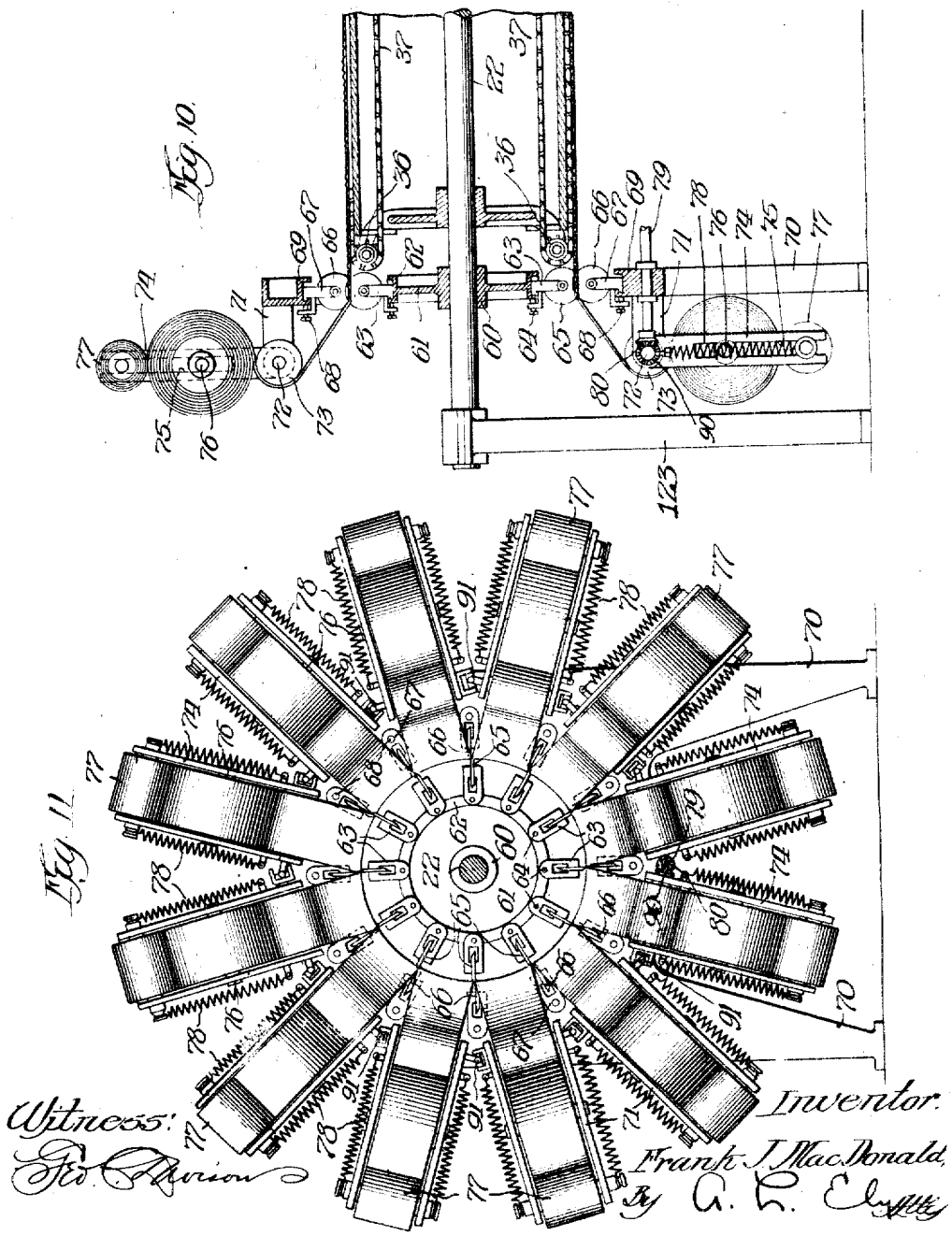

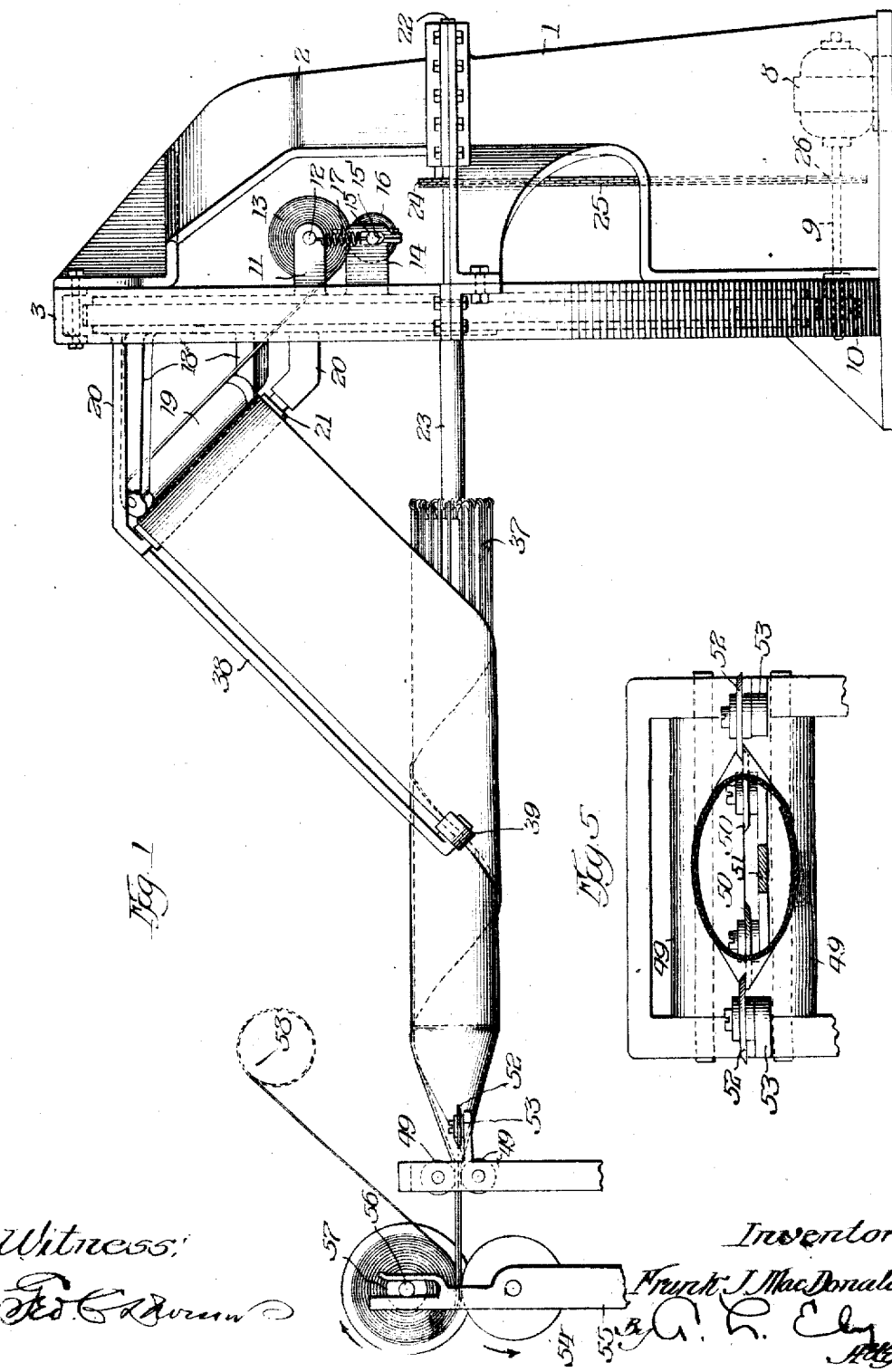

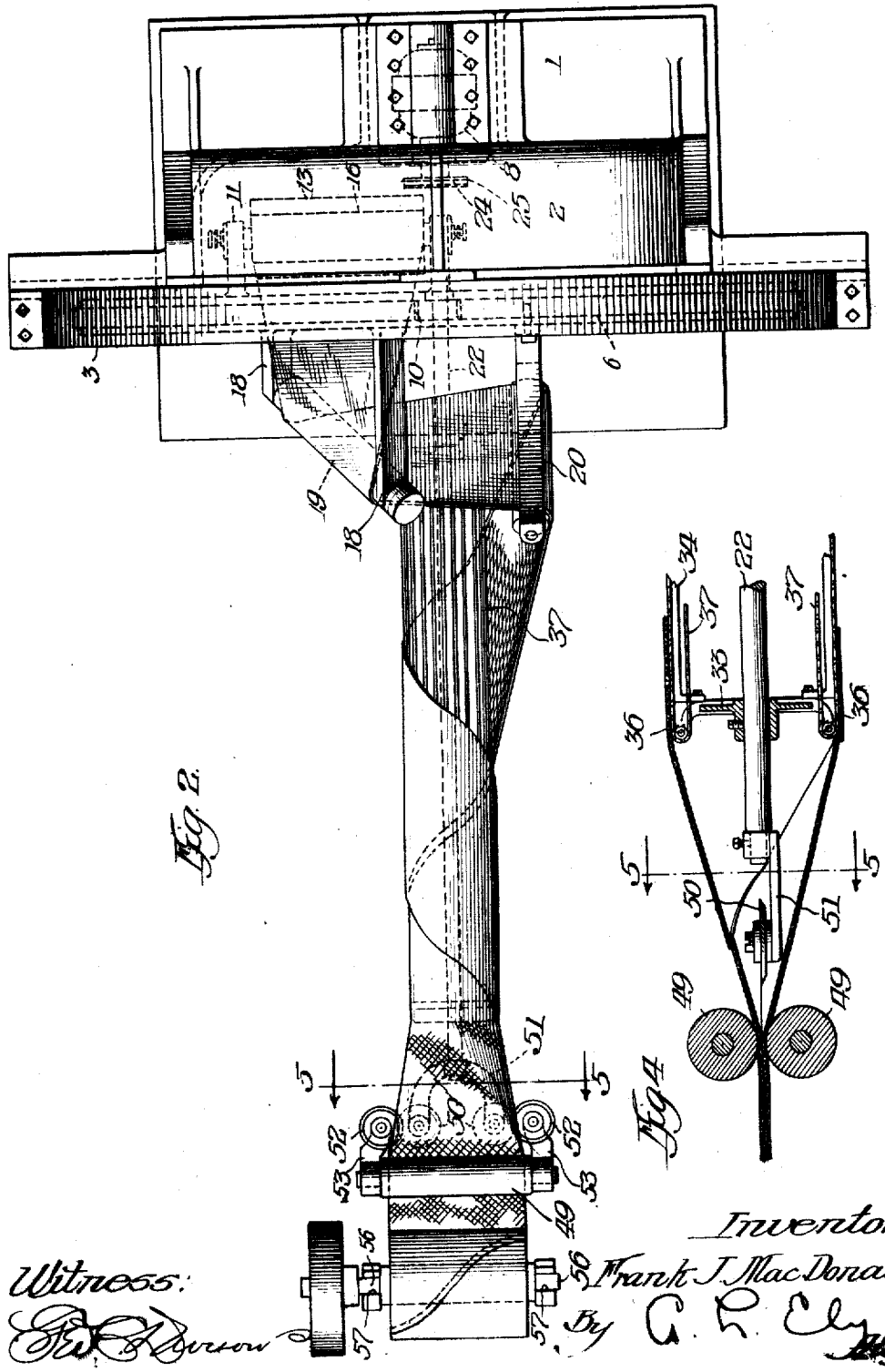

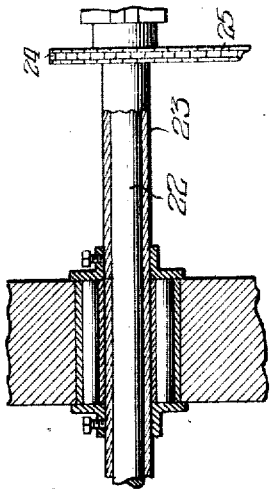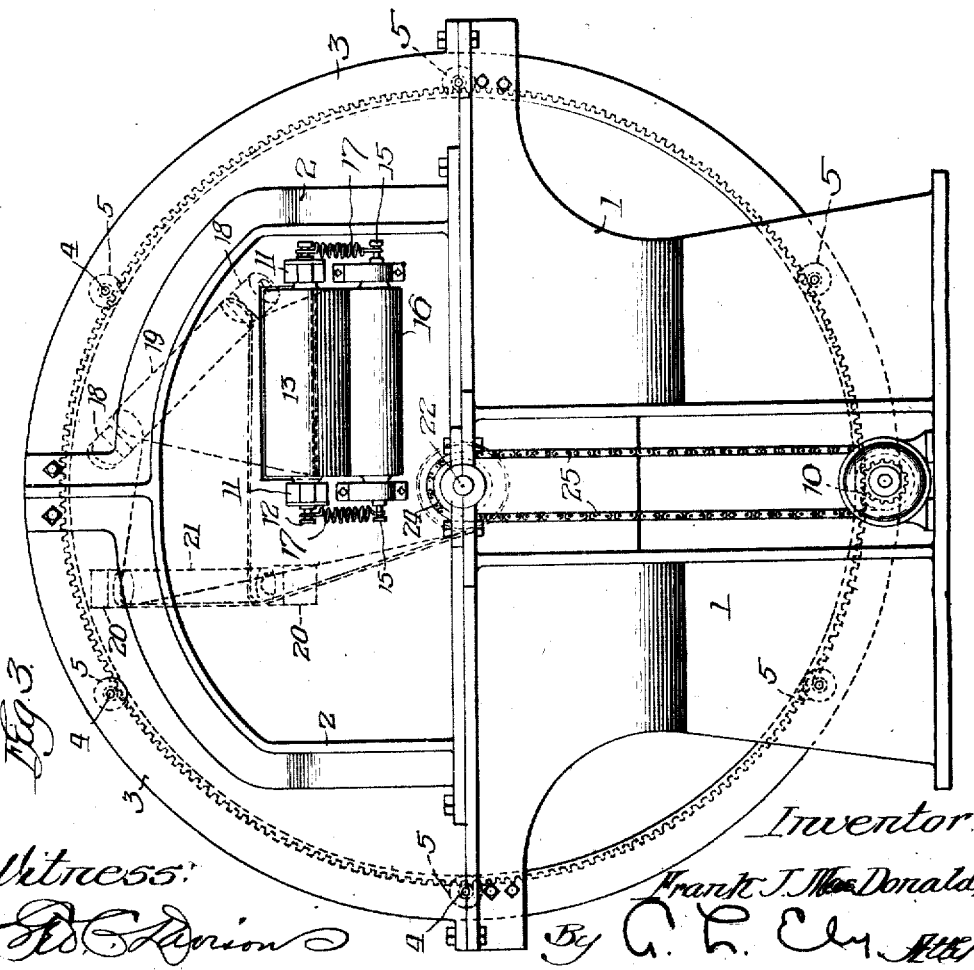

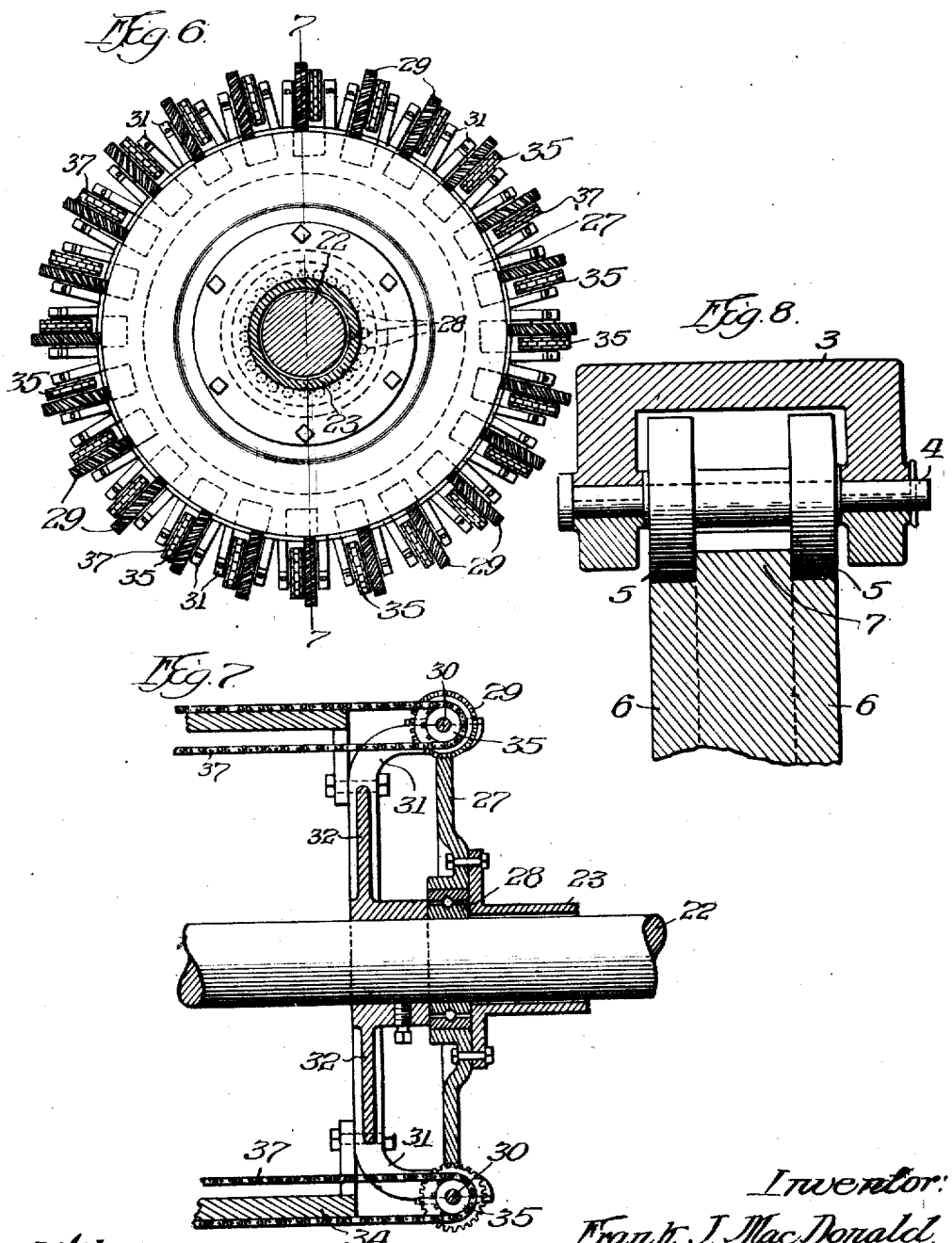

Patented Aug. 12, 1924.

1,504,255

UNITED STATES PATENT OFFICE.

FRANK J. MacDONALD, OF AKRON, OHIO, ASSIGNOR TO THE FIRESTONE TIRE AND RUBBER COMPANY, OF AKRON, OHIO, A CORPORATION OF OHIO.

METHOD OF MANUFACTURING BIAS FABRIC AND APPARATUS THEREFOR.

Application filed December 24, 1918. Serial No. 268,123.

*To all whom it may concern:*

Be it known that I, FRANK J. MAC-DONALD, a citizen of the United States, residing at Akron, in the county of Summit, State of Ohio, have invented certain new and useful Improvements in Methods of Manufacturing Bias Fabric and Apparatus Therefor, of which the following is a specification.

In the manufacture of pneumatic tires or other articles of rubber and fabric, large quantities of "bias fabric" are used, by which term is meant lengths of fabric made from rubberized canvas or other suitable fabric, which is cut in strips at an angle of 45° and then joined together end to end. To perform the cutting operation bias cutters are used which are machines embodying a reciprocating knife set at an angle to the fabric, with means for advancing the fabric under the knife. The bias strips are joined or spliced end to end by hand and wound with lining strips into rolls which are transferred to the tire machines, or wherever they are to be used.

By the method embodying the invention described herein, and by use of the apparatus shown it is possible to dispense entirely with the bias cutter and with the splicing as by my peculiar method of winding and slitting, the fabric is led directly from the roll as rubberized in the calender and in a single operation is formed into bias strips spliced together end to end.

In some instances, particularly in the manufacture of cord tires from cord fabric, it is advisable to build the tire from two layers of fabric cemented together with their major threads crossing at right angles. By one form of my invention it is possible to form the bias fabric in the condition required for use directly from the calendered rolls.

Fig. 1 is a side elevation of an apparatus for carrying out my invention showing that form in which the two ply fabric is obtained.

Fig. 2 is a plan view of Fig. 1.

Fig. 3 is a rear elevation.

Fig. 4 is a longitudinal section through the portion of the helix as it is collapsed or flattened out showing the slitting rolls.

Fig. 5 is a cross section on the lines 5—5 of Figs. 2 and 4.

Fig. 6 is an end view of the cylinder showing the means for driving the traveling belts or chains for supporting and moving the helix of fabric.

Fig. 7 is a section on the line 7—7 of Fig. 6.

Fig. 8 is a detail of the ring support.

Fig. 9 is a longitudinal section along the supporting shaft.

Fig. 10 is a section along the delivery end of the cylinder where one ply fabric is being delivered in a plurality of strips.

Fig. 11 is an end elevation of Fig. 10.

As has been stated, either single or double ply fabric with the threads at an angle of 45° to the length of the ply may be manufactured directly from the roll of fabric, as it is received from the calender where it is rubberized. In certain instances it is preferable to make a double ply fabric with their bias threads crossing at right angles, and in other instances it is preferable to assemble the fabric in a single ply form. I will first describe the two ply form of my invention.

The method which is the subject of this invention comprises the step of rotating the roll of fabric as it comes from the rubberizing calenders by mounting it on a rotating ring, from which it is led by rollers suitably arranged and wound on cylinders at an angle of 45° with a slight overlap, the degree of overlap being determined by the amount desired at the splices in the finished product. The ring carrying the fabric is revolved and the surfaces of the cylinder on which the fabric is wound, are advanced at definite relative speeds so that a continuous helix of fabric is constantly formed. The helix is drawn off in any suitable manner, being flattened as withdrawn, and is rolled together forming the two ply fabric. If desired, the fabric may be slit longitudinally as it leaves the cylinder, at any desired number of points, and wound between a liner.

If it is desired to form single ply fabric, the fabric may be slit at a plurality of places on the cylinder, forming a plurality of strips which are wound up separately between turns of liner fabric.

The machinery which will carry out the present method is shown in the drawings and may be modified in detail without departing from the present invention. It comprises a main cylinder and ring supporting frame work, consisting of a lower standard 1 and an upper arch shaped support 2. Secured to the standards 1 and 2 at suitable points is a circular guideway or shuttle track 3, at various points whereon are supported transverse pins 4 which rotatably support double flanged rollers or spools 5 on which is carried a fabric roll supporting ring 6 provided with a gear face 7 received between the flanges of the rollers.

The ring may be revolved in any suitable manner, and as an example, there may be employed a motor 8 secured to the base, the shaft 9 carrying a pinion 10 in mesh with the gear surface on the ring. To the rear face of the ring is secured a pair of brackets 11 in which is loosely received the shaft 12 of the roll of rubberized fabric and liner 13.

At one side of and parallel to the brackets 11 is a second pair of brackets 14 in which are arranged slots 15' in which is guided the shaft of a liner wind-up roll 16, contractile springs 17 being connected to the shafts 12 and 15 to keep the fabric roll and the liner roll in contact at all times.

On the front face of the ring is arranged a pair of brackets 18 which support a guide roller 19 at an angle to the line of the fabric so as to give it a twist as shown in Fig. 3. Located at another point on the face of the ring is a second pair of brackets 20 carrying a second angularly arranged roll 21, the two rollers receiving the fabric from the roll 13 and delivering it to the tubing or cylinder-making portion of the apparatus, preferably at an angle of 45°.

Mounted between the portions 1 and 2 of the supporting bracket is a horizontal shaft 22 which extends toward the front of the machine and through the center of the ring supporting the cylinder forming devices and slitting knives. Around the shaft 22 is mounted a rotary sleeve 23 to the rear end of which is secured a sprocket 24, over which is trained a chain 25 which meshes with sprocket 26 on the shaft of the motor 8. The forward end of the sleeve 23 has secured to it a large spiral master gear 27 which is supported on ball bearings 28 at the end of the sleeve.

The gear 27 meshes with a plurality of spiral gears 29 which are arranged about the shaft 22. The spiral gears are carried on short circumferentially arranged shafts 30 which are supported in pairs of brackets 31 extending radially from a central plate 32 secured to the shaft 22 and forming one end of the cylinder about which the fabric is wrapped at the 45° spiral. Near the extreme forward end of the shaft 22 is secured a second plate 33, and between the two plates 32 and 33 is secured a drum or cylinder 34.

On each shaft 30 is carried a sprocket wheel 35 and at the opposite end of the cylinder on the plate 33 is a corresponding number of sprockets 36. Between the sprockets 35 and 36 are carried endless chains or belts 37, the upper run of each chain lying in a groove or gutter in the surface of the drum and forming a traveling surface on which the helix is formed and advanced.

The fabric on leaving the roller 21 is wrapped around the cylinder or form at an angle of 45°, while the helix is advanced in timed relation to the rotation of the ring 6, causing the cylinder of fabric to be moved forward as it is wrapped around the drum, sufficient overlapping being provided to cause the turns to adhere. From one of the brackets on the rotating ring is extended an arm 38, the lower end of which carries a roller 39 which passes over the edge of the fabric as it is applied to the drum rolling the splice firmly in place, if such action may be found desirable.

In the form of the invention shown in Figs. 1 to 9 inclusive, the cylinder or helix of fabric is drawn from the drum by a pair of rollers 49 which flatten it out forming a two ply fabric with the threads at angles of 45° and crossing. If desired, the fabric may be split prior to the time that it is pressed together, two pairs of knives being used for this purpose. An inner pair of knives is shown at 50 carried on a yoke 51 secured to the forward end of the shaft 22. An outer pair of knives 52 is carried on arms 53 extending rearwardly from the roller support. The two ply bias fabric is rolled upon a power driven roller 54 carried in a support 55, the shaft 56 of the fabric roll being received in a deep recess 57 in the upper part of the support. A strip of liner is wound up with the fabric to prevent it from sticking, the liner coming from a reel 58 and being led into the turns of the fabric. The fabric, if too wide for use in the manufacture of tires, may be slit longitudinally before being mounted on the tire machine.

Instead of being pressed together to form a two-ply fabric, the helix of bias cloth may be slit longitudinally into a plurality of strips and wound up in condition to be placed on the tire-machine. A modification of the machine to carry out this embodiment of the invention is shown in Figs. 10 and 11, in which the shaft 22 is supported at its forward end by a pillar or standard 123. At the end of the cylinder or drum is secured a sleeve 60 carrying a disk 61 on the outer edge of which is a circular grooved trackway 62. In the trackway are supported a series of cutter brackets 63 which may be adjusted about the ring by means of set-screws 64. The standards carry cutters of any preferred form, preferably disks 65, which are arranged to cooperate with similar cutters or disks 66 carried on brackets 67, adjustably secured by set screws 68 in an inverted grooved trackway 69 surrounding the inner trackway 62. Any suitable form of cutters may be substituted for those shown. By means of the set screws, the positions of the cutters may be varied to cut different widths of fabric, and their number may be increased or diminished if desired.

The bias fabric strips may be conducted from the slitting knives in any desired manner. One form is shown in the drawings which is subject to alterations without affecting the invention.

The ring 69 is supported by a standard 70 and carries a series of laterally extending brackets 71, which are arranged in pairs and support shafts 72 of rollers 73 over which the fabric passes from the slitters. Secured to each pair of brackets 71 are radially extending brackets 74 which are formed with inwardly extending slots 75 in which are mounted the shafts 76 of the rolls in which the fabric is received. A roll of liner fabric 77 is received outwardly of the roll of bias fabric, strong spiral springs 78 being attached to the roll 77 and to the bracket 71 serving to hold all three of the rolls together and yet allow the fabric roll to increase in diameter as the fabric is withdrawn from the slitters. In order to wind up the fabric on the rolls, there is provided a power driven shaft 79 which carries a bevel gear 80 in mesh with a bevel gear 90 on one of the roller shafts 72. The shafts 72 of all the rolls are interconnected by universal joints 91 so that all the rolls are driven in unison.

The apparatus operates in a manner which will be readily understood by those skilled in the art. The rotation of the roll carrier causes the fabric to be wound about the cylinder in a helix, the inclination of the rolls 21 being preferably such that the fabric is wound at an angle of 45°. The chains carry the cylinder or helix of fabric forward as it is formed, the speed of the chain being such that a slight overlapping occurs, enough to make a proper splice between the several turns of fabric, the roller 39 being used to press the fabric, the roller 39 being used to press the splice together if found necessary. The fabric being now in the form of a tube or cylinder wound at an angle of 45° may be formed into a two ply strip according to the first form of my invention, or may be slit into a series of bias strips ready to be placed in the tire machines according to the form of invention shown in Figs. 10 and 11, forming it into a flattened strip or strips by collapsing the tube or withdrawing a strip bounded by elements of the cylinder or tube, cutting the cylinder along those elements.

The present invention is not limited to the form shown herein, but may be embodied in a number of modifications and variations without departing from the spirit of the invention. I consider it broadly new to form bias strips directly and then to slit the helix into a plurality of strips or to collapse the helix to form a two ply fabric, either with or without slitting.

I claim:

1. The method of obtaining a flat strip of "bias fabric" from woven fabric, comprising forming said woven fabric into a helix and slitting said helix longitudinally to form strips and flattening the strips.

2. The method of obtaining a strip of bias fabric from woven fabric comprising forming said woven fabric into a helically wound cylindrical tube, and withdrawing said strip from said tube in a length bounded by elements of said tube.

3. The method of obtaining a strip of bias fabric from woven fabric comprising the steps of forming said woven fabric into a helically wound tube, dividing said tube along elements thereof and withdrawing bias strips from said tube.

4. The method of obtaining a strip of bias fabric from woven fabric, comprising the steps of forming said woven fabric into a helically wound tube, forming an overlap between the turns of said fabric, dividing said tube along its elements to form strips and flattening the strips.

5. The method of obtaining a strip of bias fabric from woven fabric, comprising the steps of forming said rubberized woven fabric into a helically wound tube, forming an overlap between the turns of said fabric sufficient in width to cause the turns to adhere, and withdrawing said bias strip from said tube in flattened condition.

6. The method of obtaining flat strips of bias fabric from woven fabric, comprising the steps of forming said fabric into a helically wound tube, overlapping the edges of said fabric during the winding operation, and slitting said tube longitudinally to form the bias strips and flattening the strips.

7. The method of transforming woven fabric into bias fabric for use in tire construction, comprising the steps of forming said woven fabric into a helix, the several turns of said helix being overlapped sufficiently to form a splice cutting said helix along parallel lines, and withdrawing the bias fabric from said helix.

8. An apparatus for forming bias fabric comprising a roll holder, means for leading fabric from said roll and winding it into a cylinder at an angle, and means for withdrawing said fabric from said cylinder in a flattened strip.

9. An apparatus for forming bias fabric comprising a roll support, a tubular form, means for conducting fabric from the roll to said form and wrapping it about the form at an advancing angle, and means for reducing the tube of fabric to a flattened strip.

10. An apparatus for forming bias fabric comprising a roll support, a tubular form, means for conducting fabric from the said roll and winding it about the form, means for advancing the tube of fabric as it is formed, and a flattened strip forming device at the end of said form.

11. An apparatus for forming bias fabric comprising a roll support, a tubular form, means for conducting fabric from said roll and winding it about said form at an angle, of 45°, and a flat strip forming device at the end of said form.

12. An apparatus for forming bias fabric comprising a roll support, a tubular form, means for conducting fabric from said roll and winding it about said form at an angle, means to advance the tube of fabric as it is formed, an overlapping device associated with said winding means, and a device for comprising the tube into flat strips at the end of said form.

13. An apparatus for forming bias fabric comprising a roll support, a cylindrical form, means for conducting fabric from said roll and wrapping it about said form at an angle, means for moving the cylinder of fabric as it is formed, the rate of said moving means being so related to the speed of said wrapping mechanism as to form an overlap between the turns of the fabric, and a flat strip forming device in the path of said fabric cylinder.

14. An apparatus for forming bias fabic, comprising a roll support, a cylindrical form, means for conducting fabric from said roll and wrapping it about said form at an angle, means for moving the cylinder of fabric as it is formed, means for forming an overlap between the turns of said fabric, and means for reducing the cylinder to flat strips along elements thereof.

15. An apparatus for forming bias fabric, comprising a roll support, a cylindrical form, means for conducting fabric from said roll and forming it into a helix about said form, and cutting devices for dividing the cylinder of fabric longitudinally.

16. An apparatus for forming bias fabric, comprising a roll support, a cylindrical form, means for conducting fabric from said roll and forming it into a helix about said form, cutting devices for dividing the cylinder of fabric longitudinally in parallel lines.

17. An apparatus for forming bias fabric, comprising a roll support, means for rotating said support, a form located on the axis of rotation of said support, means for conducting fabric from said support to said form, a cylinder moving means in said form, and flat strip forming means at the end of said cylinder.

18. An apparatus for forming bias fabric, comprising a roll support, means for rotating said support, a cylindrical form located on the axis of rotation of said support, means for conducting fabric from said support to said cylindrical form, and a roll for receiving fabric in flattened condition from said form.

19. An apparatus for forming bias fabric, comprising a roll support, means for rotating said support, a cylindrical form, means for conducting fabric from said support to said cylindrical form, slitting mechanism for dividing said fabric as it leaves the form along elements of said cylinder, and a roll for receiving fabric in flattened condition from said form.

20. An apparatus for forming bias fabric, comprising a roll support, means for rotating said support, a moving form, means for wrapping fabric from said support about said form, and means for changing the fabric as wrapped about said form to a flat strip.

21. An apparatus for forming bias fabric, comprising a roll support, means for rotating said support, a moving form within the orbit of said support, means for conducting said fabric from said support to said form whereby a cylinder of fabric is generated, and means for reducing the cylinder of fabric formed on said moving form by said instrumentalities to a flat strip.

22. An apparatus for forming bias fabric, comprising a roll support, means for rotating said support, a moving form within the orbit of said support, means for conducting fabric from said support to said form whereby a cylinder of fabric is generated, and means for dividing the cylinder of fabric formed on said form along elements of the cylinder.

23. In an apparatus of the character described, a holder for a roll of fabric, means for helically wrapping fabric from said holder in a cylinder and means for converting said cylinder into a plurality of strips of fabric having its threads angularly arranged with respect to the length thereof.

24. In an apparatus of the character described, a holder for a roll of fabric, means for wrapping fabric from said holder in a cylinder at an advancing angle, and cutting mechanism to divide said cylinder along its elements.

25. In an apparatus of the character described, a rotating ring, means on said ring for supporting a roll of fabric, a form located on the axis of said ring, a moving surface on said form, and a roll at the end of said form to receive the fabric longitudinally from the end of the form.

26. In an apparatus of the character described, a fabric roll carrier, means for rotating said carrier, guiding means for said fabric, a form adapted to receive said fabric at an angle from said guiding means, means for causing the surface of the form to travel with respect to said carrier, and a roll for receiving fabric from said form in flattened condition.

27. In an apparatus of the character described, a fabric roll carrier, means for rotating said carrier, guiding means for said fabric, a form adapted to receive said fabric from said guiding means at an angle to form a cylinder of fabric, means for causing the surface of the form to travel with respect to said carrier, a cutter adapted to divide said cylinder along parallel lines, and a roll for receiving fabric from said form in flattened condition.

28. In an apparatus of the character described, a fabric roll carrier, means for rotating said carrier, guiding means for the fabric, a form adapted to receive said fabric from said guiding means at an angle, means for causing the cylinder of fabric to travel over the form as it is built up, and a roll for receiving fabric from said form in flattened condition.

29. In an apparatus of the character described, a fabric roll carrier, means for rotating said carrier, guiding means for the fabric, a form adapted to receive said fabric from said guiding means at an angle, means for causing the cylinder of fabric to travel over the form as it is built up, a device for forming an overlapping of the edges of the fabric, and a roll for receiving fabric from said form in flattened condition.

30. In an apparatus of the character described, a fabric roll carrier, means for rotating said carrier, guiding means for the fabric, a form adapted to receive said fabric from said guiding means at an angle, means for causing the cylinder of fabric to travel over said form as it is built up, slitting mechanism for dividing the fabric longitudinally along elements of the cylinder, and a roll for receiving fabric from said form in flattened condition.

31. In an apparatus of the character described, a fabric roll carrier, means for rotating said carrier, guiding means for the fabric, a form adapted to receive said fabric from said guiding means at an angle of 45°, means for causing the cylinder of fabric to move over the form as it is built up, a device for overlapping the edges of the fabric in the cylinder, and slitting mechanism for dividing the fabric longitudinally along elements of said cylinder.

32. In an apparatus of the character described, a fabric roll carrier, means for rotating said carrier, guiding means for the fabric, a form adapted to receive said fabric from said guiding means at an angle of 45°, means for causing the cylinder of fabric to move over the form as it is built up, a device for overlapping the edges of the fabric in the cylinder, slitting mechanism for dividing the fabric longitudinally along elements of said cylinder, and means for receiving said fabric from said form in flattened condition.

FRANK J. MacDONALD.